United States Patent
Weng et al.

(10) Patent No.: US 8,580,353 B2
(45) Date of Patent: Nov. 12, 2013

(54) METHOD FOR TREATING SURFACE OF GLASS SUBSTRATE AND APPARATUS FOR PERFORMING SAME

(75) Inventors: Chien-Min Weng, Tao-Yuan (TW); Shih-Liang Chou, Tao-Yuan (TW); Tzu-Wen Chu, Tao-Yuan (TW); Fu-Jen Wang, Tao-Yuan (TW)

(73) Assignee: Applied Vacuum Coating Technologies Co., Ltd., Yang-Mei Jen, Tao-Yuan (TW)

( * ) Notice: Subject to any disclaimer, the term of this patent is extended or adjusted under 35 U.S.C. 154(b) by 63 days.

(21) Appl. No.: 12/832,738

(22) Filed: Jul. 8, 2010

(65) Prior Publication Data

US 2012/0009354 A1 Jan. 12, 2012

(51) Int. Cl.
*H05H 1/00* (2006.01)
*C23C 14/02* (2006.01)

(52) U.S. Cl.
USPC .......................... 427/533; 427/532; 427/534

(58) Field of Classification Search
USPC ......... 427/566, 532, 533, 534, 535, 539, 540, 427/567, 596, 597; 204/192.38; 118/723 FE
See application file for complete search history.

(56) References Cited

U.S. PATENT DOCUMENTS

| | | | |
|---|---|---|---|
| 4,063,210 A * | 12/1977 | Collver | 338/7 |
| 6,300,641 B1 * | 10/2001 | Koh et al. | 250/492.21 |
| 6,365,016 B1 * | 4/2002 | Iacovangelo et al. | 204/192.38 |
| 6,787,441 B1 * | 9/2004 | Koh et al. | 438/608 |
| 6,808,606 B2 * | 10/2004 | Thomsen et al. | 204/192.3 |
| 6,989,280 B2 * | 1/2006 | Ko | 438/7 |
| 2004/0140198 A1 * | 7/2004 | Cho et al. | 204/192.29 |

OTHER PUBLICATIONS

Tada et al, Cleaning of Glass Disk in Oxygen Plasma by Using Compact Electron-Beam-Excited Plasma Source, Jpn. J. Appl. Phys, 2002, vol. 41, pp. 6553-6556.*

* cited by examiner

*Primary Examiner* — Dah-Wei Yuan
*Assistant Examiner* — Nga Leung V Law
(74) *Attorney, Agent, or Firm* — Jackson IPG PLLC

(57) ABSTRACT

A method for treating a surface of a glass substrate according to the invention has the steps of placing the glass substrate into a vacuum treatment chamber, introducing a gas into the vacuum treatment chamber, providing electric power to generate an ion source and using the ion source to treat the surface of the glass substrate. By this way, the invention can achieve an effect of surface cleaning and further render the conductive film to be coated on the glass substrate in the subsequent stage to have a reduced surface resistance, thereby improving the conductivity of the glass substrate. The film coated on the glass substrate in the subsequent stage will have higher crystalline level as well.

6 Claims, 6 Drawing Sheets

METHOD FOR TREATING SURFACE OF GLASS SUBSTRATE AND APPARATUS FOR PERFORMING SAME

BACKGROUND OF THE INVENTION

1. Field of the Invention

The present invention relates to a method for treating a surface of a glass substrate and an apparatus for performing the same. According to the invention, the surface of the glass substrate is subjected to an ion source pretreatment, so as to achieve an effect of surface cleaning and further render the conductive film to be coated on the glass substrate in the subsequent stage to have a reduced surface resistance, thereby improving the conductivity of the glass substrate.

2. Description of the Prior Art

Flat display devices have recently been widely used, such as in liquid crystal televisions, computers, mobile phones and personal digital assistants (PDA). Glass substrates are considered to be one of the critical materials employed during the manufacture of flat display devices. Nevertheless, the substrate cleaning system now used in substrate producing processes remains to be improved.

Conventional processes for cleaning a glass substrate have to use a tremendous amount of chemical cleaning agents and consume an even more amount of water in subsequent rinsing and drying stages. These wetting cleaning processes not only generate volatile organic gaseous pollutants but also waste water and time. Recently, the Taiwan's Environmental Protection Department is ready to go ahead to amend the environmental protection regulations as a means to levy volatile organic compound (VOC) emission fees. The regulations, if put in effect, would surely force domestic manufacturers to adopt new cleaning processes. Meanwhile, as the global trend of manufacturing green products through green processes continuously progresses and many related regulations are being envisaged or already in force, the conventional wet cleaning processes apparently fail to satisfy the needs.

SUMMARY OF THE INVENTION

An object of the invention is to provide a method for treating a surface of a glass substrate to be used in an electronic device and an apparatus for performing the same. According to the invention, the surface of the glass substrate is subjected to an ion source pretreatment, so as to achieve an effect of surface cleaning and further render the conductive film to be coated on the glass substrate in the subsequent stage to have a reduced surface resistance, thereby improving the conductivity of the glass substrate.

In order to achieve the object described above, the method for treating a surface of a glass substrate according to the invention comprises placing the glass substrate into a vacuum treatment chamber, followed by introducing a gas into the vacuum treatment chamber and providing electric power to generate an ion source which is in turn used to treat the surface of the glass substrate. By virtue of the aforesaid technical means, the invention can achieve an effect of surface cleaning and further render the conductive film to be coated on the glass substrate in the subsequent stage to have a reduced surface resistance, thereby improving the conductivity of the glass substrate. According to the invention, the film coated on the glass substrate in the subsequent stage will have higher crystalline level as well.

BRIEF DESCRIPTION OF THE DRAWINGS

The above and other objects, features and effects of the invention will become apparent with reference to the following description of the preferred embodiments taken in conjunction with the accompanying drawings, in which.

DETAILED DESCRIPTION OF THE PREFERRED EMBODIMENTS

Figure 1:
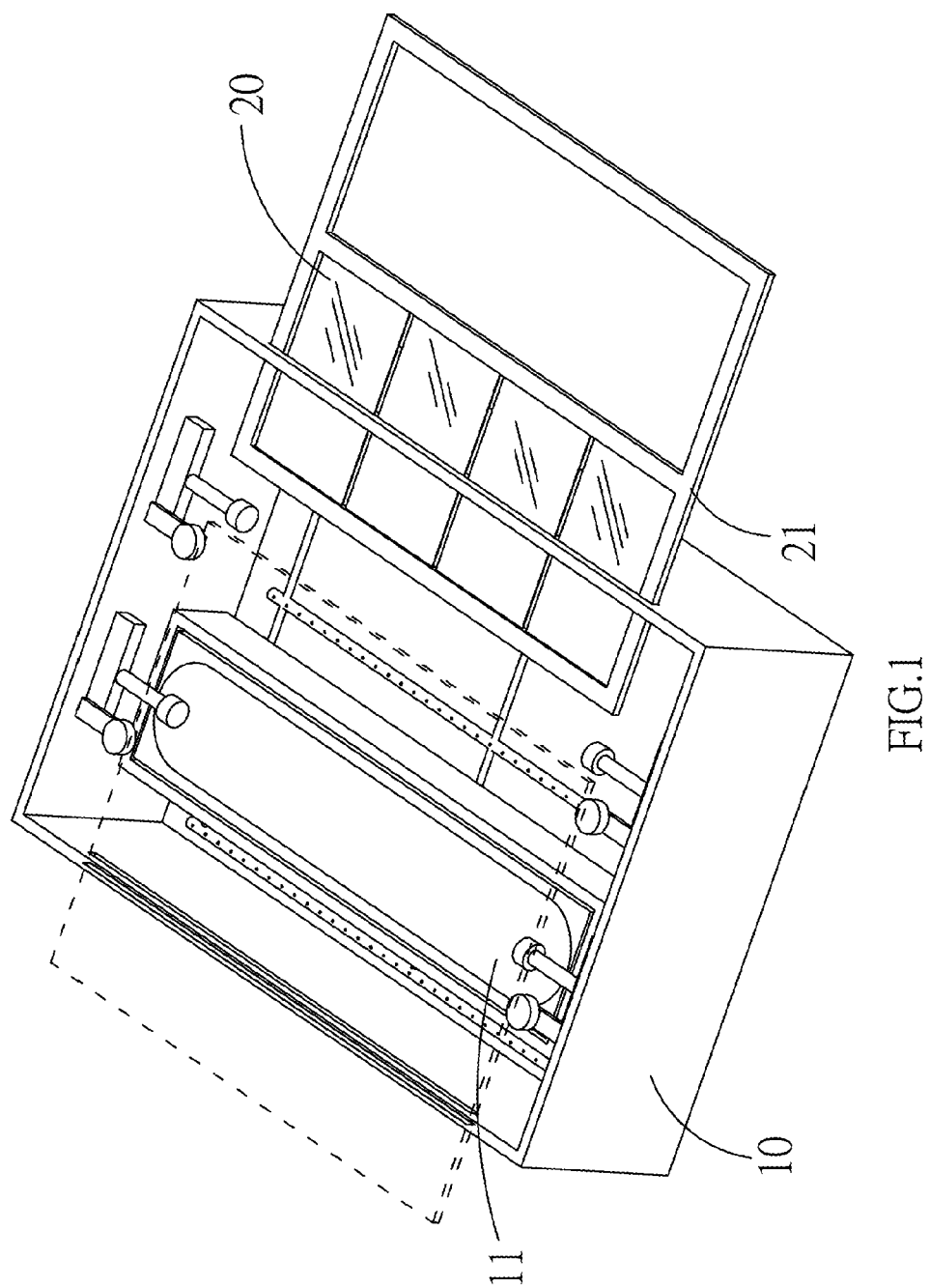
FIG. 1 is a perspective schematic diagram illustrating a surface treatment apparatus of the invention.
Figure 2:
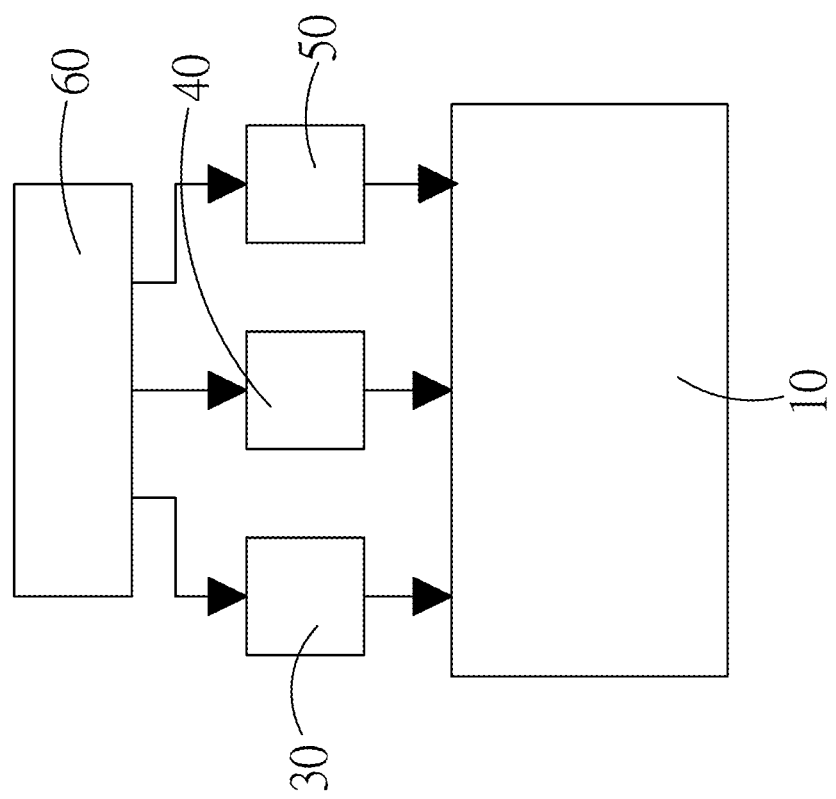
FIG. 2 is a structural schematic diagram illustrating the surface treatment apparatus of the invention.

The present invention relates to a method for treating a surface of a glass substrate and an apparatus for performing the same. As shown in FIGS. 1 and 2, the apparatus for treating a surface of a glass substrate comprises:

a glass-carrying trolley 21 for carrying a glass substrate 20 and delivering the glass substrate 20;

a vacuum treatment chamber 10 provided with an electron gun 11 for receiving the glass substrate 20 delivered by the glass-carrying trolley 21;

a vacuum pump 30 in flow communication with the vacuum treatment chamber 10 to create a vacuum level within the vacuum treatment chamber 10;

a gas supplier 40 in flow communication with the vacuum treatment chamber 10 to supply a gas into the vacuum treatment chamber 10;

a power supplying device 50 electrically connected to the electron gun 11 of the vacuum treatment chamber 10 to provide electric power to the electron gun 11, thereby allowing the electron gun 11 to emit an electron beam; and a controller 60 connected to and controlling the vacuum pump 30, the gas supplier 40 and the power supplying device 50. The controller 60 is useful for, such as controlling the vacuum level created by the vacuum pump 30, or the pressure, mass flow rate and feeding time of the gas supplied from the gas supplier 40, or the voltage level of the electrical power provided by the power supplying device 50.

Figure 3:
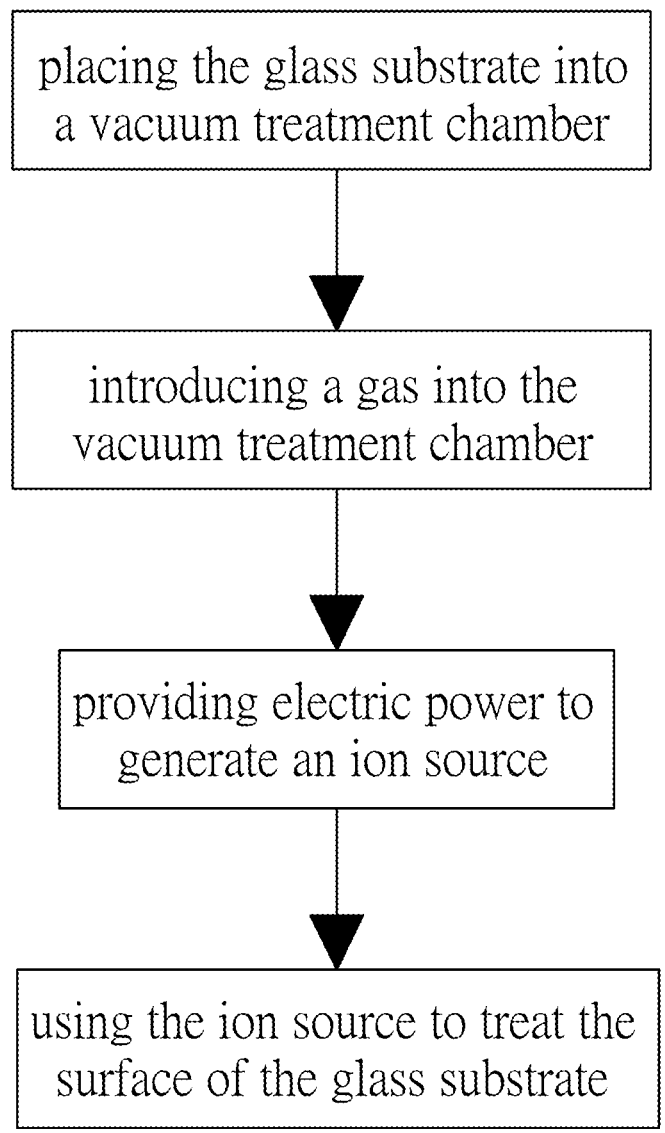
FIG. 3 is a schematic diagram illustrating a surface treatment method of the invention.

Now referring to FIG. 3, the treatment method according to the invention is performed by use of the apparatus described above, which comprises the steps of:

Step A: delivering a glass substrate 20 to the vacuum treatment chamber 10 by using the glass-carrying trolley 21;

Step B: supplying a gas into the vacuum treatment chamber 10 using the gas supplier 40, wherein the gas comprises oxygen (with a gas mass flow rate of 10~50 SCCM) and argon (with a gas mass flow rate of 10~50 SCCM);

Step C: providing electric power from the power supplying device 50 to generate an ion source, wherein the voltage level of the electric power is controlled in a range between 500~2000V (preferably between 800~1200V) and the vacuum treatment chamber 10 has a working pressure controlled between 1~5 mtorr;

Step D: using the ion source to treat a surface of the glass substrate 20.

The invention takes advantage of the fact that the ion source contains low energy active atomic clusters which, when used to treat a surface of a glass substrate, not only achieve an effect of surface cleaning and further render the conductive film to be coated on the glass substrate in the subsequent stage to have a reduced surface resistance, thereby improving the conductivity of the glass substrate.

Figure 4:
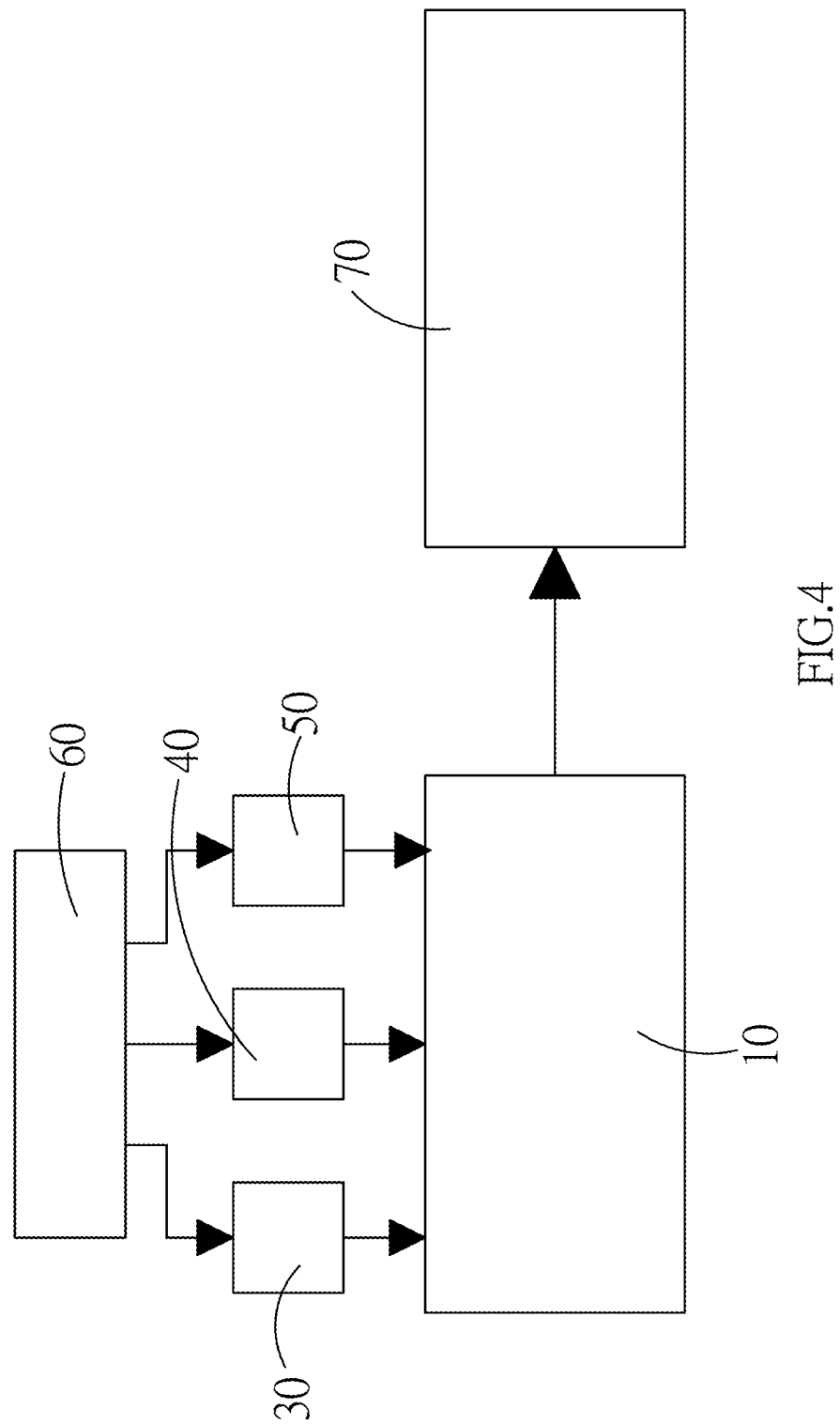
FIG. 4 is another structural schematic diagram illustrating the surface treatment apparatus of the invention.
Figure 5:
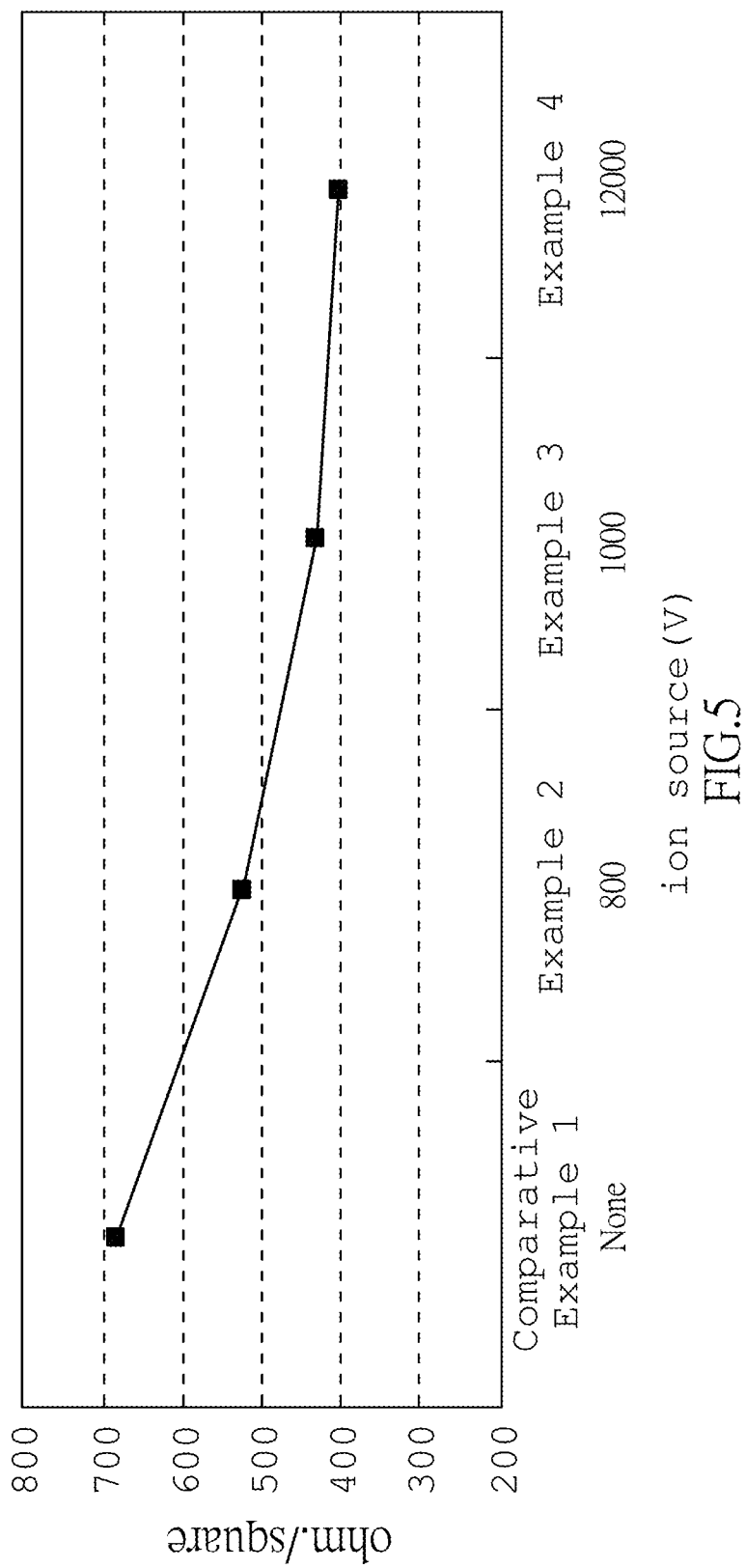
FIG. 5 is a diagram showing the effect of the ion source pretreatment on the surface resistance of a glass substrate.

The surface treatment apparatus may be further provided with a film-coating device 70. As illustrated in FIG. 4, the film-coating device 70 is provided downstream to the vacuum treatment chamber 10, so that the glass substrate is subjected to a film-coating process after Step D is performed. The film-coating process comprises coating a conductive film, such as an indium tin oxide (ITO) conductive film, onto at least one surface of the glass substrate. According to the invention, the glass substrate is pretreated with an ion source, so that the subsequently coated film has higher crystalline level. The effect of the ion source pretreatment on the surface resistance of a glass substrate is shown in FIG. 5. Comparative Example 1 is directed to a glass substrate without being subjected to an ion source pretreatment, whereas Examples 2~4 are glass substrates subjected to the ion source pretreatment. The abscissa (V) shown in FIG. 5 indicates the voltage level of the electrical power supplied to the vacuum treatment chamber 10, while the ordinate (ohm./square) indicates surface resistance values of the tested glass substrates. It can be seen from FIG. 5 that the glass substrate without being subjected to an ion source pretreatment (Comparative Example 1) exhibits a greater surface resistance value (approximately 683 ohm./square) as compared to the glass substrates subjected to the ion source pretreatment (Examples 2~4). Among Examples 2~4, the glass substrate of Example 4 has the smallest value of surface resistance (approximately 402 ohm./square).

Furthermore, since the glass substrates according to the invention are pretreated with an ion source, the conductive films coated on the glass substrates in the subsequent stage have higher crystalline level and, hence, can have a reduced thickness. As such, the inventive glass substrates with the conductive films are more suitable for use in the production of optoelectronic devices, such as touch panels, and the optoelectronic devices so produced exhibit an increased overall transparency due to the slimness of the films coated on the glass substrates.

Figure 6:
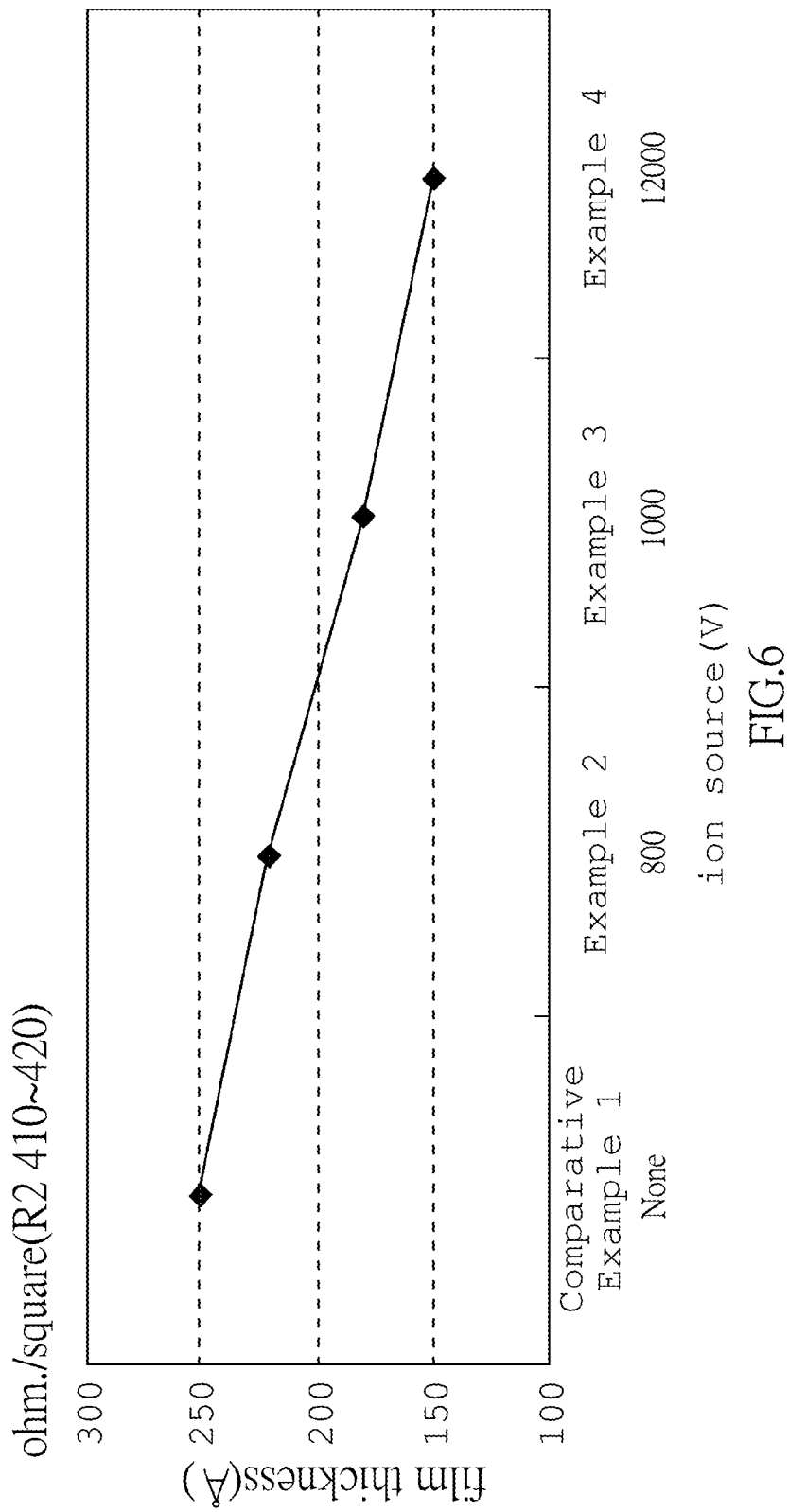
FIG. 6 is a diagram showing the effect of the ion source pretreatment on the thickness of the indium tin oxide film coated on a glass substrate.

The effect of the ion source pretreatment on thickness of the indium tin oxide film coated on a glass substrate is shown in FIG. 6 (The tested glass substrates are so prepared under the same surface resistance). Again, Comparative Example 1 is directed to a glass substrate without being subjected to an ion source pretreatment, whereas Examples 2~4 are glass substrates subjected to the ion source pretreatment. The abscissa (V) shown in FIG. 6 indicates the voltage level of the electrical power supplied to the vacuum treatment chamber 10, while the ordinate (angstrom; represented by Å) indicates the thickness of the indium tin oxide film coated. It can be seen from FIG. 6 that the indium tin oxide film coated on the glass substrate without being subjected to an ion source pretreatment (Comparative Example 1) is thicker (approximately 250 Å) as compared to the indium tin oxide films coated on the glass substrates subjected to the ion source pretreatment (Examples 2~4). Among Examples 2~4, the indium tin oxide film of Example 4 has the smallest film thickness (approximately 150 Å).

While the invention has been described with reference to the preferred embodiments above, it should be recognized that the preferred embodiments are given for the purpose of illustration only and are not intended to limit the scope of the present invention and that various modifications and changes, which will be apparent to those skilled in the relevant art, may be made without departing from the spirit of the invention and the scope thereof as defined in the appended claims.

What is claimed is:

1. A method for producing a glass substrate coated with a conductive film, comprising the steps of:
   A. placing the glass substrate into a vacuum treatment chamber;
   B. introducing a gas into the vacuum treatment chamber provided with an electron gun;
   C. providing electric power having a voltage level ranged between 800~1200V to the electron gun, so that the electron gun emits an electron beam and the electron beam strikes the gas to generate an ion source;
   D. subjecting a surface of the glass substrate to a pretreatment by directing the ion source towards the surface of the glass substrate; and
   E. coating a conductive film onto the pretreated surface of the glass substrate after the pretreatment, so that the pretreated surface of the glass substrate is coated with the conductive film having a reduced surface electrical resistance and a higher crystalline level as compared to a conductive film coated on a glass substrate that has not been subjected to the pretreatment in Step D.

2. The method for treating a surface of a glass substrate according to claim 1, wherein the conductive film is an indium tin oxide (ITO) conductive film.

3. The method for treating a surface of a glass substrate according to claim 1, wherein the step B comprises introducing the gas of oxygen and argon.

4. The method for treating a surface of a glass substrate according to claim 3, wherein the oxygen is introduced at a gas mass flow rate of 10~50 SCCM.

5. The method for treating a surface of a glass substrate according to claim 3, wherein the argon is introduced at a gas mass flow rate of 10~50 SCCM.

6. The method for treating a surface of a glass substrate according to claim 1, wherein the vacuum treatment chamber has a working pressure controlled between 1~5 mtorr.

* * * * *